(12) United States Patent
Shokawa

(10) Patent No.: US 8,112,762 B2
(45) Date of Patent: Feb. 7, 2012

(54) BLADE SERVER AND SERVICE START METHOD THEREFORE

(75) Inventor: Takashi Shokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1245 days.

(21) Appl. No.: 11/822,731

(22) Filed: Jul. 9, 2007

(65) Prior Publication Data

US 2009/0024996 A1 Jan. 22, 2009

(30) Foreign Application Priority Data

Jul. 10, 2006 (JP) ................. 2006-189056

(51) Int. Cl.
*G06F 13/00* (2006.01)
*G06F 15/16* (2006.01)
*G06F 15/177* (2006.01)

(52) U.S. Cl. ........ 719/313; 709/208; 709/220; 709/222; 713/1; 713/2

(58) Field of Classification Search ......................... None
See application file for complete search history.

(56) References Cited

U.S. PATENT DOCUMENTS

| | | | |
|---|---|---|---|
| 7,013,385 B2 * | 3/2006 | Abbondanzio et al. | 713/2 |
| 7,120,787 B2 * | 10/2006 | Chu et al. | 713/1 |
| 7,330,965 B2 * | 2/2008 | Chu et al. | 713/1 |
| 2003/0226004 A1 | 12/2003 | Abbondanzio et al. | |
| 2005/0097360 A1 | 5/2005 | Chu et al. | |

FOREIGN PATENT DOCUMENTS

| | | |
|---|---|---|
| JP | 2003-110490 A | 4/2003 |
| JP | 2003-273791 A | 9/2003 |
| JP | 2004-157996 A | 6/2004 |
| JP | 2005-260503 A | 9/2005 |
| JP | 2005-293430 A | 10/2005 |
| JP | 2005-339528 A | 12/2005 |
| JP | 2006-085209 A | 3/2006 |
| WO | WO 2004/107169 A1 | 12/2004 |

OTHER PUBLICATIONS

United Kingdom Search and Examination Report dated Nov. 5, 2007.
Japanese Office Action dated Oct. 4, 2011, with partial English translation.

* cited by examiner

*Primary Examiner* — Qing Wu
(74) *Attorney, Agent, or Firm* — McGinn Intellectual Property Law Group, PLLC

(57) ABSTRACT

A blade server includes a management blade and managed blade. The management blade manages service data necessary for the service of an application. In the managed blade, the application is activated. The managed blade includes a service data list creation unit and service data list transmission unit. The service data list creation unit creates a service data list representing service data necessary for the service of the application. The service data list transmission unit transmits the service data list created by the service data list creation unit to the management blade. The management blade includes a service data transmission unit. The service data transmission unit transmits, to the managed blade, service data in the service data list transmitted from the service data list transmission unit before the service of the application starts. A service start method for a blade server is also disclosed.

18 Claims, 6 Drawing Sheets

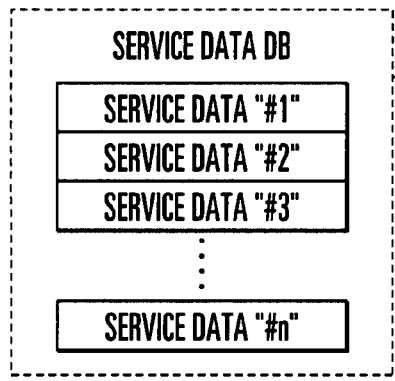
FIG. 2
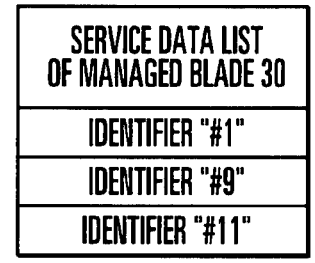
FIG. 3A
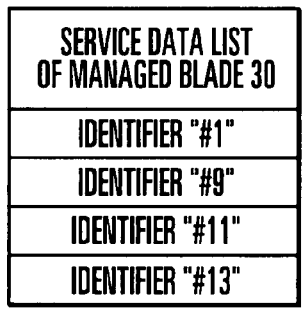
FIG. 3B
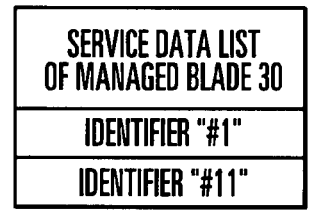
FIG. 3C
| IDENTIFIER | FLAG |
|---|---|
| #1 | NO |
| #9 | NO |
| #11 | NO |
FIG. 4A
| IDENTIFIER | FLAG |
|---|---|
| #1 | YES |
| #9 | YES |
| #11 | YES |
FIG. 4B
| IDENTIFIER | FLAG |
|---|---|
| #1 | NO |
| #9 | NO |
| #11 | NO |
| #13 | NO |
FIG. 4C
| IDENTIFIER | FLAG |
|---|---|
| #1 | YES |
| #9 | YES |
| #11 | YES |
| #13 | YES |
FIG. 4D
| IDENTIFIER | FLAG |
|---|---|
| #1 | YES |
| #9 | NO |
| #11 | YES |
FIG. 4E

BLADE SERVER AND SERVICE START METHOD THEREFORE

BACKGROUND OF THE INVENTION

This application is based upon and claims the benefit of priority from Japanese patent application No. 2006-189056, filed on Jul. 10, 2006, the disclosure of which is incorporated herein in its entirety by reference.

The present invention relates to a blade server which quickens the start of application services, and a method therefor.

In a system comprised of a plurality of servers, each server individually manages failure-prone portions such as a hard disk, power supply, and fan, and the reliability of the overall system cannot be increased.

To solve this, blade servers in which failure-prone portions are minimized have been developed.

The blade server comprises a common unit which gathers failure-prone portions, and a plurality of blades each having elements such as a memory and microprocessor necessary for a computer on one board.

Of these blades, the common unit, especially a management blade which manages a hard disk manages data (to be referred to as "service data" hereinafter) necessary for the services of applications activated in the remaining blades (to be referred to as "managed blades" hereinafter). The managed blade requests necessary service data of the management blade, and starts application services on the basis of the acquired service data (see, e.g., Japanese Patent Laid-Open Nos. 2005-293430, 2005-339528, and 2006-085209).

If managed blades simultaneously request service data, access concentrates on the management blade to cause communication congestion and congestion to the hard disk of the management blade.

There has been proposed a technique of preventing the congestion by expanding service data in advance in a memory managed by each managed blade and accessing the memory at the start of application services. This technique can increase the service data read speed, and can also quicken the start of application services.

According to this technique, expansion of all service data managed by the management blade into the memory of each managed blade consumes a large memory capacity. Hence, the memory consumption of each managed blade is minimized by expanding only service data necessary to start application services in each managed blade.

However, service data expanded in the memory of each managed blade change every time an application is added/deleted to/from a managed blade or the contents of service data change. The administrator of the blade server must set again in advance service data to be expanded in the memory of each managed blade. The setting is cumbersome to the administrator.

SUMMARY OF THE INVENTION

It is an object of the present invention to provide a blade server which automatically expands, in the memory of each managed blade, only service data necessary to start application services in the managed blade even when service data expanded in the memory of the managed blade change, and a service start method therefor.

There is provided a blade server comprising a management blade which manages service data necessary for a service of an application, and a managed blade in which the application is activated, the managed blade comprising service data list creation means for creating a service data list representing service data necessary for the service of the application, and service data list transmission means for transmitting the service data list created by the service data list creation means to the management blade, and the management blade comprising service data transmission means for transmitting, to the managed blade, service data in the service data list transmitted from the service data list transmission means before the service of the application starts.

There is also provided a service start method for a blade server comprising the steps of creating a service data list representing service data necessary for a service of an application in a managed blade in which the application is activated, transmitting the service data list from the managed blade to a management blade which manages service data, transmitting, from the management blade to the managed blade, service data in the service data list transmitted to the management blade before the service of the application starts, and starting the service of the application using the service data transmitted to the managed blade.

BRIEF DESCRIPTION OF THE DRAWINGS

FIG. 2 is a view showing an internal structure of a service data DB;

FIGS. 3A to 3C are views illustrating a service data list;

FIGS. 4A to 4E are views showing the use state of service data;

DESCRIPTION OF THE PREFERRED EMBODIMENT

A blade server according to an exemplary embodiment of the present invention will be described in detail below with reference to the accompanying drawings.

Figure 1:
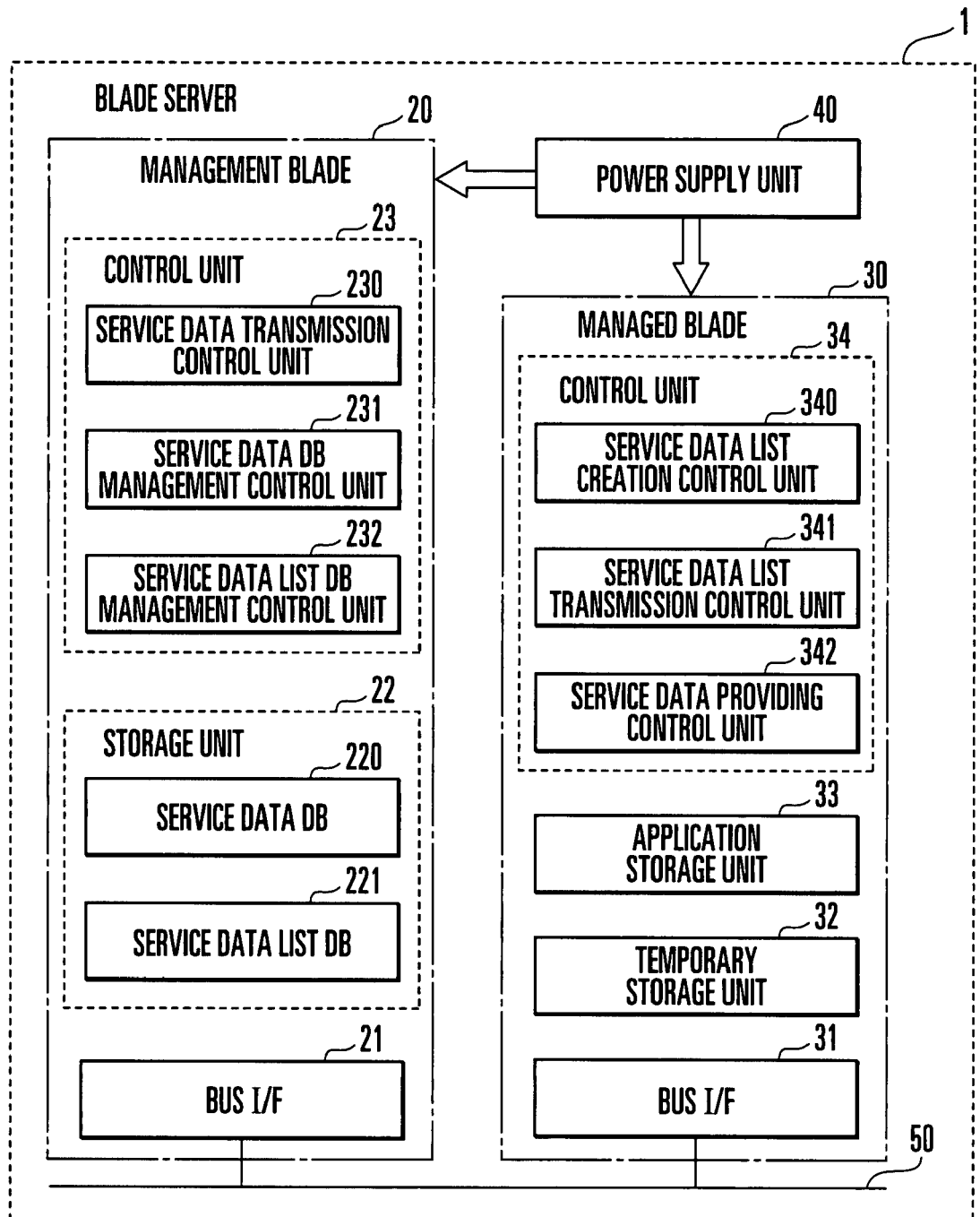
FIG. 1 is a block diagram showing the arrangement of a blade server according to an exemplary embodiment of the present invention.

As shown in FIG. 1, a blade server 1 according to the exemplary embodiment of the present invention comprises a management blade 20, managed blades 30, a power supply unit 40 common to the blades, and a bus 50 which connects the management blade 20 to the managed blades 30.

FIG. 1 exemplifies the arrangement of only one of the managed blades 30, and does not illustrate those of the remaining managed blades.

The arrangement of the management blade 20 will be explained.

The management blade 20 comprises a bus I/F (InterFace) 21 serving as an interface with the bus 50, a readable/writable nonvolatile storage unit 22 which is only one storage of the blade server 1, a control unit 23 which controls functional units.

The storage unit 22 is, e.g., a hard disk. The storage unit 22 comprises a service data DB 220 and service data list DB 221.

The service data DB 220 stores service data necessary to start application services in each managed blade. For example, as shown in FIG. 2, the service data DB 220 stores n service data "#1" to "#n" (n is an integer of 1 or more).

These service data are necessary to start services by an application, such as the address of a connection destination and the number of connections necessary to provide services, or data shared with other applications.

The service data list DB 221 corresponds to a service data storage means in the present invention. The service data list DB 221 stores a service data list of identifiers representing service data necessary to start application services in each managed blade. For example, as shown in FIG. 3A, the service data list of the managed blade 30 holds identifiers "#1", "#9", and "#11" representing service data "#1", "#9", and "#11" among service data stored in the service data DB 220.

The control unit 23 comprises a service data transmission control unit 230, service data DB management control unit 231, and service data list DB management control unit 232.

The service data transmission control unit 230 corresponds to a service data transmission means in the present invention. The service data transmission control unit 230 is a functional unit which transmits service data to a managed blade before the start of application services.

The service data DB management control unit 231 is a functional unit which newly adds, changes, or deletes service data in the service data DB 220.

The service data list DB management control unit 232 is a functional unit which newly adds, changes, or deletes the service data list DB 221 on the basis of a service data list transmitted from each managed blade.

The control unit 23 comprises, e.g., a CPU, a main storage, and a memory which stores programs and various data for implementing a variety of operations of the blade server 1. The control unit 23 loads a program from the storage unit 22 and executes it, implementing the above-described functions in cooperation with the hardware components.

The arrangement of the managed blade 30 will be explained.

The managed blade 30 comprises a bus I/F (InterFace) 31 serving as an interface with the bus 50, a volatile temporary storage unit 32 such as a memory, an application storage unit 33 serving as a read-only nonvolatile storage unit, and a control unit 34 which controls functional units.

The application storage unit 33 is a so-called ROM (Read Only Memory), and stores applications.

The control unit 34 comprises a service data list creation control unit 340, service data list transmission control unit 341, and service data providing control unit 342.

The service data list creation control unit 340 corresponds to a service data list creation means in the present invention. The service data list creation control unit 340 is a functional unit which creates a service data list representing service data necessary to activate an application.

The service data list transmission control unit 341 corresponds to a service data list transmission means in the present invention. The service data list transmission control unit 341 is a functional unit which. transmits a service data list created by the service data list creation control unit 340 to the management blade 20.

The service data providing control unit 342 corresponds to a service data providing means in the present invention. The service data providing control unit 342 is a functional unit which responds to a service data request from an application.

The control unit 34 comprises, e.g., a CPU, a main storage, and a memory which stores programs and various data for implementing a variety of operations of the managed blade 30. The control unit 34 loads a program from the application storage unit 33 and executes it, implementing the above-described functions in cooperation with the hardware components.

Operation procedures to activate an application in the blade server 1 according to the exemplary embodiment will be explained with reference to the accompanying drawings by dividing the operation procedures into "1. initial operation procedures", "2. service data use operation procedures", "3. service data addition operation procedures", and "4. service data deletion operation procedures". "1. initial operation procedures" represent operation procedures to create a service data list in initial activation of an application. "2. service data use operation procedures" represent operation procedures using a created service data list. "3. service data addition operation procedures" represent operation procedures to add service data to a service data list. "4. service data deletion operation procedures" represent operation procedures when service data contain unnecessary service data. These operation procedures will be explained by exemplifying the operation of the managed blade 30 as those of managed blades.

"1. Initial Operation Procedures"

Figure 5:
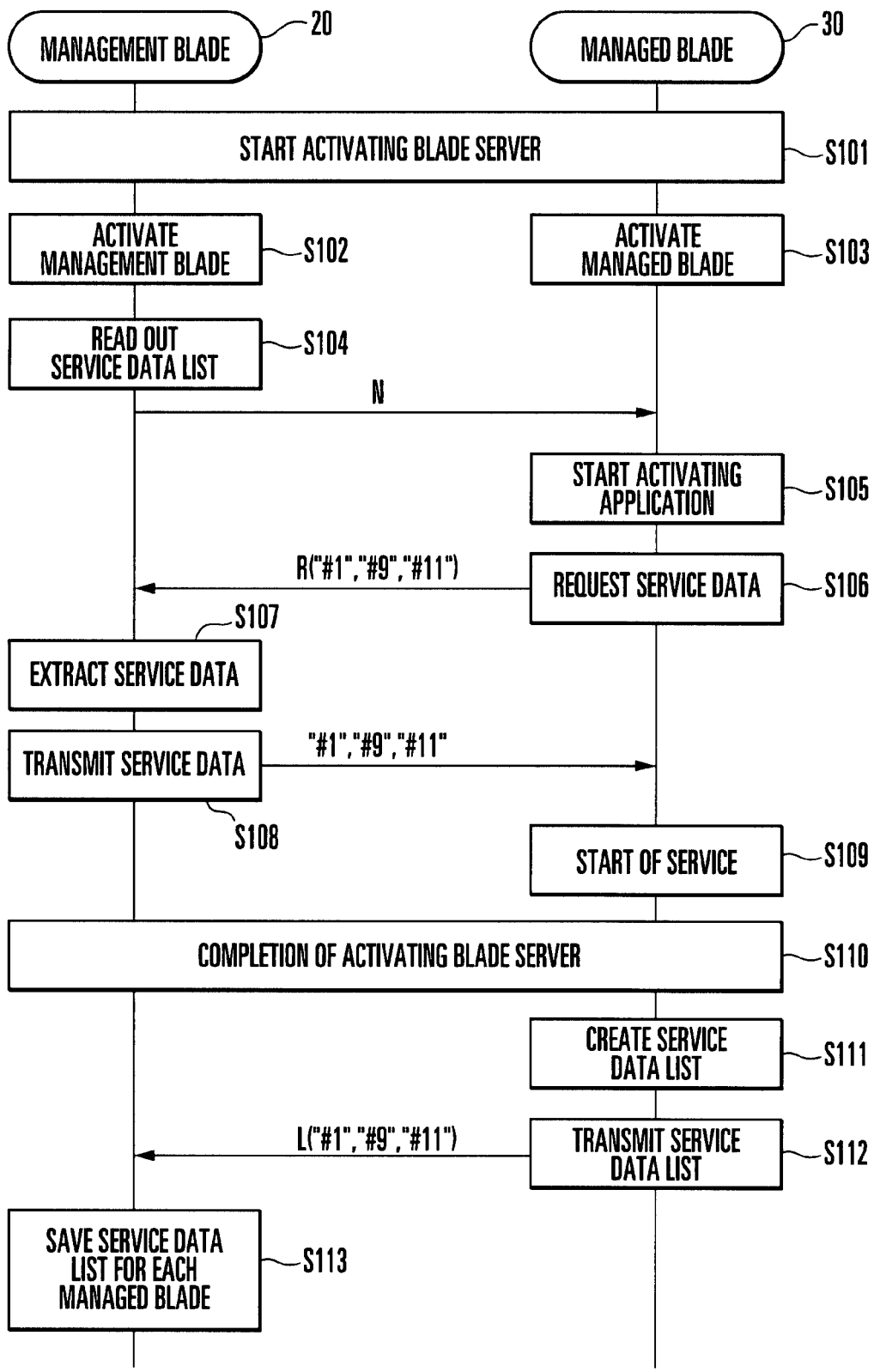
FIG. 5 is a flowchart for explaining the initial operation procedures of the blade server shown in FIG. 1.

The initial activation operation of the blade server 1 according to the exemplary embodiment will be described with reference to FIG. 5.

First, the blade server 1 is activated (step S101). Then, the management blade 20 and managed blade 30 are also activated (steps S102 and S103).

The service data DB management control unit 231 of the activated management blade 20 refers to the service data list DB 221. Since no service data list is created, the control unit 23 transmits only an application activation notification N to the managed blade 30 via the bus I/F 21 to instruct the managed blade 30 to activate an application (step S104).

In the managed blade 30 upon receiving the application activation notification N via the bus I/F 31, the control unit 34 reads out the application from the application storage unit 33 to the temporary storage unit 32, and activates it (step S105).

The activated application requests service data "#1", "#9", and "#11" of the service data providing control unit 342. The service data providing control unit 342 creates a distribution list which makes service data correspond to whether or not the service data is provided to the application, for each service data requested by the application and each service data in the temporary storage unit 32. For example, FIG. 4A shows a distribution list which makes the identifier of each service data correspond to "YES" or "NO" representing whether or not the service data is provided to the application. At this stage, no service data is provided to the application, and the identifier of each service data corresponds to "NO".

In these operation procedures, since the temporary storage unit 32 does not store any service data, the service data providing control unit 342 transmits a request R ("#1", "#9", and "#11") for service data "#1", "#9", and "#11" to the management blade 20 via the bus I/F 31 (step S106).

In the management blade 20 upon receiving the request R for service data "#1", "#9", and "#11" via the bus I/F 21, the service data DB management control unit 231 extracts the requested service data from service data stored in the service data DB 220 (step S107). The service data transmission control unit 230 transmits service data "#1", "#9", and "#11" extracted by the service data DB management control unit 231 to the managed blade 30 via the bus I/F 21 (step S108).

In the managed blade 30 upon receiving service data "#1", "#9", and "#11" via the bus I/F 31, the service data providing control unit 342 transfers (provides) them to the application. The service data-transferred application starts services on the basis of service data "#1", "#9", and "#11" (step S109). In this step, the distribution list is updated from, e.g., FIG. 4A to FIG. 4B. FIG. 4B shows that service data "#1", "#9", and "#11" are provided to the application.

Then, application services in each managed blade start, and the activation of the blade server 1 is complete (step S110).

The service data list creation control unit 340 of the managed blade 30 creates a service data list of only selected service data (flag "YES") provided to the application among service data in the distribution list (step S111). For example, as for the distribution list shown in FIG. 4B, all service data "#1", "#9", and "#11" in the distribution list are provided. Thus, the service data list creation control unit 340 creates a service data list L ("#1", "#9", and "#11") representing service data "#1", "#9", and "#11", as shown in FIG. 3A. The service data list transmission control unit 341 transmits the service data list to the management blade 20 via the bus I/F 31 (step S112).

In the management blade 20 upon receiving the service data list via the bus I/F 21, the service data list DB management control unit 232 stores the service data list in the service data list DB 221 (S113).

The above-described operation is performed for each managed blade and each application. As a result, the service data list DB 221 stores service data lists for each managed blade and each application in each managed blade.

"2. Service Data Use Operation Procedures"

The service data use operation procedures of the blade server 1 according to the exemplary embodiment will be described with reference to FIG. 6.

First, the blade server 1 is activated (step S201). Then, the management blade 20 and managed blade 30 are also activated (steps S202 and S203).

The service data DB management control unit 231 in the activated management blade 20 refers to the service data list DB 221. Since a service data list has been created by "1. initial operation procedures" described above, the service data list DB management control unit 232 reads out the service data list from the service data list DB 221. The service data DB management control unit 231 extracts service data from the service data DB 220 on the basis of the service data list. Assuming that service data "#1", "#9", and "#11" are extracted, the service data transmission control unit 230 transmits them to the managed blade 30 via the bus I/F 21. The control unit 23 further transmits an application activation notification N to the managed blade 30 via the bus I/F 21 (step S204).

In the managed blade 30 upon receiving the service data and application activation notification via the bus I/F 31, the control unit 34 stores the received service data "#1", "#9", and "#11" in the temporary storage unit 32 (step S205). The control unit 34 reads out an application from the application storage unit 33 into the temporary storage unit 32, and activates it (step S206).

The activated application requests service data "#1", "#9", and "#11" of the service data providing control unit 342. The service data providing control unit 342 creates a distribution list which makes service data correspond to whether or not the service data is provided to the application, as shown in FIG. 4A, for each service data requested by the application.

In these operation procedures, since the temporary storage unit 32 stores service data, the service data providing control unit 342 extracts service data "#1", "#9", and "#11" from the temporary storage unit 32 (step S207).

After service data "#1", "#9", and "#11" are extracted from the temporary storage unit 32, the service data providing control unit 342 transfers (provides) them to the application. The service data-transferred application starts services on the basis of service data "#1", "#9", and "#11" (step S208).

Upon completion of activating all applications, the activation of the blade server 1 is complete (step S209). Steps S210 to S212 are the same as steps S112 to S114 described above, and a description thereof will not be repeated.

In this manner, service data managed by the management blade 20 are expanded in advance in the temporary storage unit 32 of each managed blade. Before the start of application services, service data in the temporary storage unit 32 are extracted, and need not be requested of the management blade 20. This can prevent communication congestion to the management blade 20, and congestion to the storage unit 22 of the management blade 20. The use of service data in the temporary storage unit 32 of each managed blade can increase the service data read speed in an application in each managed blade. The application requests service data of the service data providing control unit 342, and the service data providing control unit 342 provides the service data. The administrator need not change the service data requesting destination in the application.

"3. Service Data Addition Operation Procedures"

The service data addition operation procedures of the blade server 1 according to the exemplary embodiment will be described with reference to FIG. 7. A case where an application is added to the managed blade 30 upon completion of activating the blade server 1, and service data "#13" is newly required to start services will be exemplified.

Figure 6:
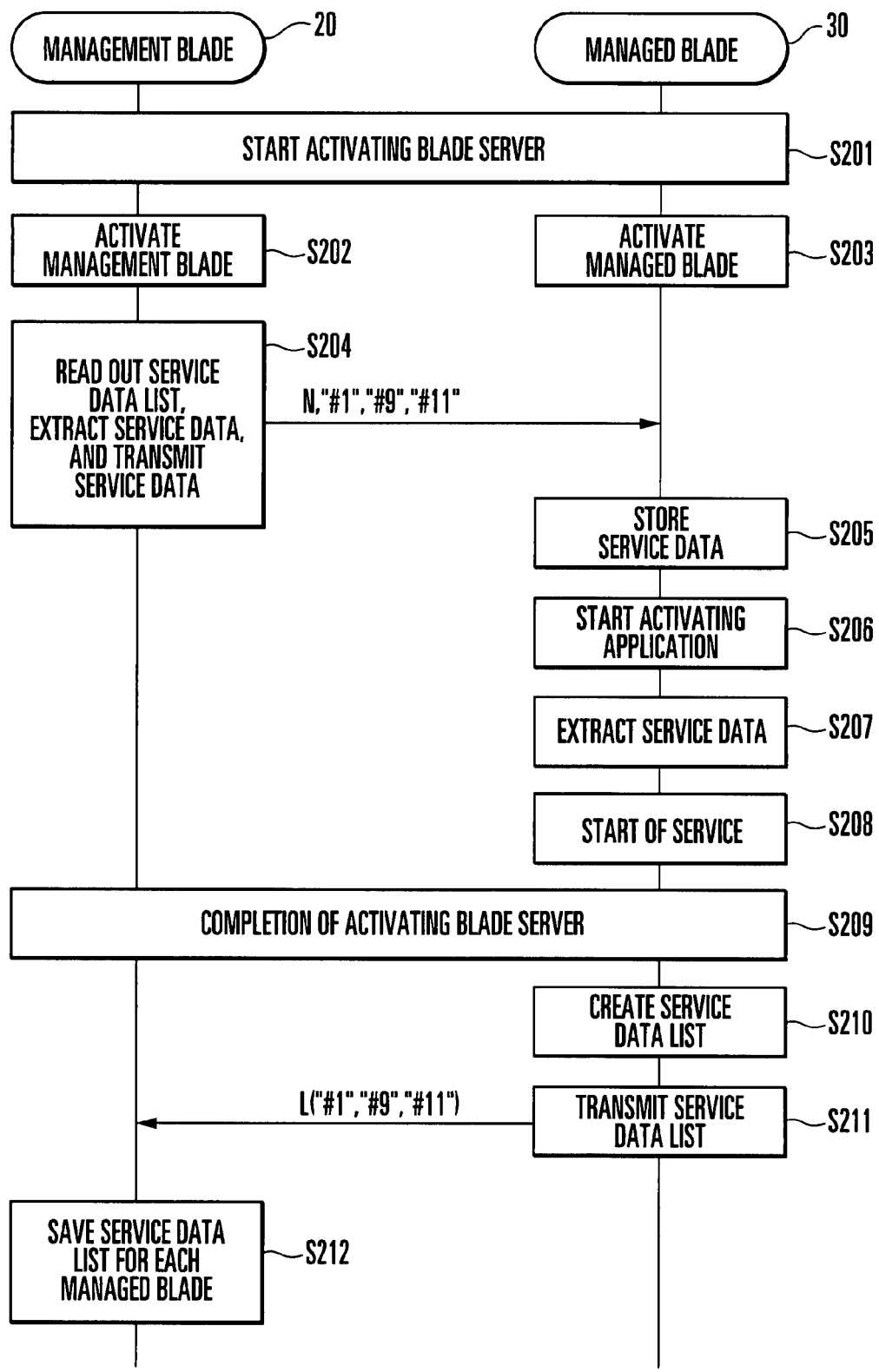
FIG. 6 is a flowchart for explaining the service data use operation procedures of the blade server shown in FIG. 1.
Figure 7:
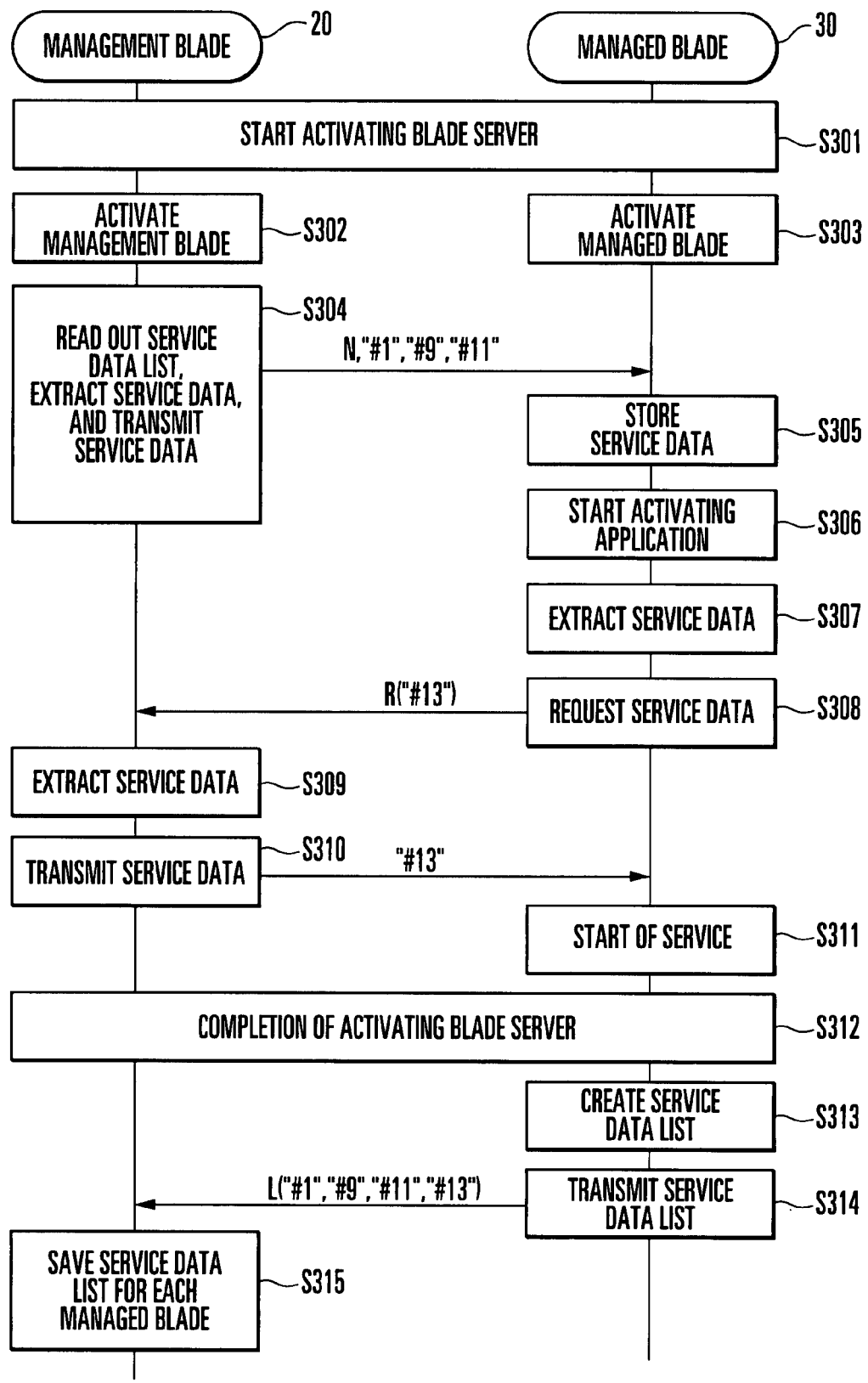
FIG. 7 is a flowchart for explaining the service data addition operation procedures of the blade server shown in FIG. 1.

Steps S301 to S306 in FIG. 7 are the same as steps S201 to S206 in FIG. 6, and a description thereof will not be repeated. The service data addition operation procedures will be explained from step S307 in which the control unit 34 of the managed blade 30 stores received service data "#1", "#9", and "#11" in the temporary storage unit 32 and activates an application.

The activated application requests service data "#1", "#9", "#11", and "#13" of the service data providing control unit 342. The service data providing control unit 342 creates a distribution list which makes service data correspond to whether or not the service data is provided to the application, as shown in FIG. 4C, for each service data requested by the application and each service data in the temporary storage unit 32.

In these operation procedures, since the temporary storage unit 32 stores service data "#1", "#9", and "#11", the service data providing control unit 342 extracts them from the temporary storage unit 32 (step S307). Since the temporary storage unit 32 does not store service data "#13", the service data providing control unit 342 transmits a request R ("#13") for service data "#13" to the management blade 20 via the bus I/F 31 (step S308).

In the management blade 20 upon receiving the request for service data "#13" via the bus I/F 21, the service data DB management control unit 231 extracts the requested service data "#13" from service data stored in the service data DB 220 (step S309). The service data transmission control unit 230 transmits service data "#13" extracted by the service data DB management control unit 231 to the managed blade 30 via the bus I/F 21 (step S310).

In the managed blade 30 upon receiving service data "#13" via the bus I/F 31, the service data providing control unit 342 transfers (provides) service data "#13", and service data "#1", "#9", and "#11" in the temporary storage unit 32 to the application. The service data-transferred application starts services on the basis of service data "#1", "#9", "#11", and "#13" (step S311). In this step, the distribution list is updated from, e.g., FIG. 4C to FIG. 4D. FIG. 4D shows that service data "#1", "#9", "#11", and "#13" are provided to the application.

Then, application services in each managed blade start, and the activation of the blade server 1 is complete (step S312).

The service data list creation control unit 340 of the managed blade 30 creates a service data list of only selected service data (flag "YES") provided to the application among service data in the distribution list (step S313). For example, as for the distribution list shown in FIG. 4D, all service data "#1", "#9", "#11", and "#13" in the distribution list are provided. Thus, the service data list creation control unit 340 creates a service data list L ("#1", "#9", "#11", and "#13") representing service data "#1", "#9", "#11", and "#13", as shown in FIG. 3B. That is, the service data list creation control unit 340 creates a service data list on the basis of changed service data to which service data "#13" is newly added. The service data list transmission control unit 341 transmits the service data list to the management blade 20 via the bus I/F 31 (step S314).

In the management blade 20 upon receiving the service data list via the bus I/F 21, the service data list DB management control unit 232 stores the service data list in the service data list DB 221 (S315).

By these operation procedures, a service data list containing service data "#13" which becomes newly necessary in the managed blade is created. At the next start of services, the service data providing control unit 342 need not request service data "#13" of the management blade 20, and only extracts it from the temporary storage unit 32.

"4. Service Data Deletion Operation Procedures"

The service data deletion operation procedures of the blade server 1 according to the exemplary embodiment will be described with reference to FIG. 8. A case where an application is deleted from the managed blade 30 upon completion of activating the blade server 1, and service data "#9" necessary to activate the application becomes unnecessary will be exemplified.

Figure 8:
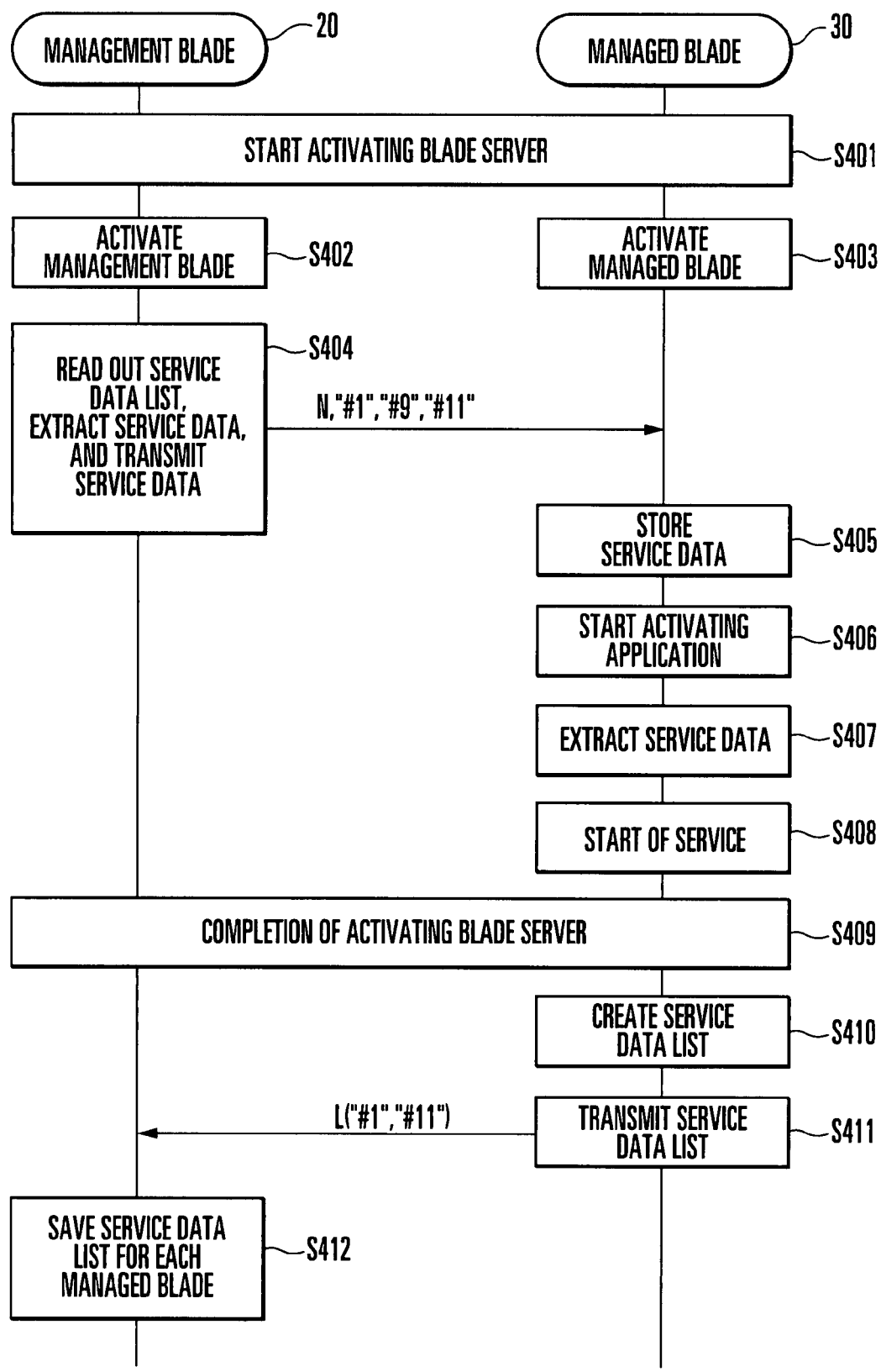
FIG. 8 is a flowchart for explaining the service data deletion operation procedures of the blade server shown in FIG. 1.

Steps S401 to S406 in FIG. 8 are the same as steps S201 to S206 in FIG. 6, and a description thereof will not be repeated. The service data deletion operation procedures will be explained from step S407 in which the control unit 34 of the managed blade 30 stores received service data "#1", "#9", and "#11" in the temporary storage unit 32 and activates an application.

The activated application requests service data "#1" and "#11" of the service data providing control unit 342. The service data providing control unit 342 creates a distribution list which makes service data correspond to whether or not the service data is provided to the application, as shown in FIG. 4A, for each service data requested by the application and each service data in the temporary storage unit 32.

In these operation procedures, since the temporary storage unit 32 stores service data, the service data providing control unit 342 extracts only service data "#1" and "#11" from the temporary storage unit 32 (step S407).

After service data "#1" and "#1" are extracted from the temporary storage unit 32, the service data providing control unit 342 transfers (provides) them to the application. The service data-transferred application starts services on the basis of service data "#1" and "#11" (step S408). In this step, the distribution list is updated from, e.g., FIG. 4A to FIG. 4E. FIG. 4E shows that service data "#1" and "#11" are provided to the application, and no service data "#9" is provided.

Upon completion of activating all applications, the activation of the blade server 1 is complete (step S409).

The service data list creation control unit 340 creates a service data list of only selected service data (flag "YES") provided to the application among service data in the distribution list (step S410). For example, as for the distribution list shown in FIG. 4E, service data "#1" and "#11" among service data "#1", "#9", and "#11" in the distribution list are provided. Thus, the service data list creation control unit 340 creates a service data list L ("#1" and "#11") representing service data "#1" and "#11", as shown in FIG. 3C. That is, the service data list creation control unit 340 creates a service data list on the basis of changed service data from which service data "#9" is deleted. The service data list transmission control unit 341 transmits the service data list to the management blade 20 via the bus I/F 31 (step S411).

In the management blade 20 upon receiving the service data list via the bus I/F 21, the service data list DB management control unit 232 stores the service data list in the service data list DB 221 (S412).

By these operation procedures, a service data list except service data "#9" which becomes unnecessary in the managed blade 30 is created. At the next start of services, the temporary storage unit 32 does not store service data "#9". Accordingly, the use of the memory and bus by unnecessary data can be avoided.

In the above-described operation procedures, when there are a plurality of service data, the service data request/reception method upon activating an application can be arbitrarily designed in accordance with specifications such that service data are requested and received repetitively or at once.

In the above-described operation procedures, when a plurality of applications are activated, a service data list is created for each application. The service data list creation control unit 340 may create a service data list in parallel with activation of an application. In this case, the service data list creation method can be arbitrarily designed in accordance with specifications such that the identifiers of service data used to activate an application are sequentially added to a service data list without creating lists as shown in FIGS. 4A to 4E.

In the above-described operation procedures, when a plurality of applications exist in the application storage unit 33, the application activation operation method can be arbitrarily designed in accordance with the specifications of the managed blade 30 such that applications are activated sequentially or in parallel with each other.

In the exemplary embodiment, the application storage unit 33 is arranged in the managed blade 30. Alternatively, the application storage unit 33 may be arranged in the management blade 20, and the managed blade 30 may download an application from the management blade 20 upon activating the managed blade 30. In this case, the storage unit 22 may store an application without using the application storage unit 33.

As described above, according to the exemplary embodiment, the blade server 1 can create a service data list corresponding to the application service state of the managed blade by using the service data list creation control unit 340. The service data transmission control unit 230 transmits service data to each managed blade on the basis of the service data list. Even if service data expanded in the memory of each managed blade change, the blade server 1 can automatically expand, in the memory of the managed blade, only service data necessary to start application services in the managed blade.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A blade server comprising:
a management blade which manages service data necessary for a service of an application; and
a managed blade in which the application is activated,
said managed blade comprising:
service data list creation means for creating a service data list representing service data provided to the application after the service of the application starts; and
service data list transmission means for transmitting the service data list created by said service data list creation means to said management blade, and
said management blade comprising:
service data list storage means for storing the service data list transmitted from said service data list transmission means; and
service data transmission means for transmitting, to said managed blade, service data in the service data list stored in said service data list storage means before said management blade starts and read out from said service data list storage means after said management blade starts.

2. A server according to claim 1, wherein said managed blade further comprises service data providing means for providing service data transmitted from said service data transmission means to the application.

3. The blade server according to claim 1, wherein the service data list represents only service data necessary to start application services in the managed blade.

4. The blade server according to claim 3, wherein the service data necessary to start application services comprises at least one of an address of a connection destination, a number of connections necessary to provide services, and data shared with other applications.

5. The blade server according to claim 1, wherein said management blade comprises a service data database configured to store service data necessary to start application services in the managed blade.

6. The blade server according to claim 1, wherein the service data list includes a list of identifiers representing service data necessary to start application services in the managed blade.

7. The blade server according to claim 1, wherein said managed blade is one of a plurality of managed blades, and
wherein said management blade adds, changes, or deletes service data based on a service data list transmitted from each of the plurality of managed blades.

8. The blade server according to claim 1, wherein said service data list creation means creates the service data list of only selected service data provided to the application among service data included in a distribution list.

9. The blade server according to claim 1, wherein said managed blade is one of a plurality of managed blades, and
wherein said storage data list storage means stores service data lists from each of the plurality of managed blades.

10. The blade server according to claim 1, wherein said managed blade is one of a plurality of managed blades, each of said plurality of managed blades comprising a temporary storage means, and
wherein service data managed by the managed blade is expanded before the start of the service of the application in each of said plurality of managed blades.

11. The blade server according to claim 10, wherein, before the start of the service of the application, service data in the temporary storage means of each of said plurality of managed blades is extracted.

12. A blade server comprising:
a management blade which manages service data necessary for a service of an application; and
a managed blade in which the application is activated,
said managed blade comprising:
service data list creation means for creating a service data list representing service data necessary for the service of the application;
service data list transmission means for transmitting the service data list created by said service data list creation means to said management blade; and
service data providing means for providing service data transmitted from said service data transmission means to the application, and
said management blade comprising service data transmission means for transmitting, to said managed blade, service data in the service data list transmitted from said service data list transmission means before the service of the application starts,
wherein when service data which becomes necessary upon changing service data necessary for the service of the application is absent in service data transmitted from said service data transmission means, said service data providing means requests the absent service data of said management blade,
said service data transmission means transmits the service data requested by said service data providing means to said service data providing means, and
said service data list creation means creates a service data list on the basis of changed service data provided from said service data providing means to the application.

13. A blade server comprising:
a management blade which manages service data necessary for a service of an application; and
a managed blade in which the application is activated,
said managed blade comprising:
service data list creation means for creating a service data list representing service data necessary for the service of the application;
service data list transmission means for transmitting the service data list created by said service data list creation means to said management blade; and
service data providing means for providing service data transmitted from said service data transmission means to the application, and
said management blade comprising service data transmission means for transmitting, to said managed blade, service data in the service data list transmitted from said service data list transmission means before the service of the application starts,
wherein when service data which becomes unnecessary upon changing service data necessary for the service of the application exists in service data transmitted from said service data transmission means, said service data providing means extracts only necessary service data from the service data transmitted from said service data transmission means, and provided the necessary service data to the application, and
wherein said service data list creation means creates a service data list on the basis of changed service data provided from said service data providing means to the application.

14. A service start method for a blade server, comprising:
creating a service data list representing service data provided to an application after service of the application starts;

transmitting the service data list from the managed blade to a management blade which manages service data;

storing, on the management blade, the service data list transmitted from the managed blade;

transmitting, from the management blade to the managed blade, service data in the service data list stored in the management blade before the management blade starts and read out after said management blade starts; and starting the service of the application using the service data transmitted to the managed blade.

15. A method according to claim 14, wherein said starting the service of the application comprises providing the application with service data transmitted to the managed blade.

16. A service start method for a blade server comprising:

creating a service data list representing service data necessary for a service of an application in a managed blade in which the application is activated;

transmitting the service data list from the managed blade to a management blade which manages service data;

transmitting, from the management blade to the managed blade, service data in the service data list transmitted to the management blade before the service of the application starts;

starting the service of the application using the service data transmitted to the managed blade;

when service data which becomes necessary upon changing service data necessary for the service of the application is absent in service data transmitted to the managed blade, causing the managed blade to request the absent service data of the management blade;

transmitting the service data requested by the managed blade from the management blade to the managed blade;

providing the application with service data based on the service data list and service data based on the request to start the service of the application; and creating a service data list on the basis of changed service data provided to the application, wherein said starting the service of the application comprises providing the application with service data transmitted to the managed blade.

17. A service start method for a blade server, comprising:

creating a service data list representing service data necessary for a service of an application in a managed blade in which the application is activated;

transmitting the service data list from the managed blade to a management blade which manages service data;

transmitting, from the management blade to the managed blade service data in the service data list transmitted to the management blade before the service of the application starts;

starting the service of the application using the service data transmitted to the managed blade;

when service data which becomes unnecessary upon changing service data necessary for the service of the application exists in service data transmitted to the managed blade, extracting only necessary service data from the service data transmitted to the managed blade to provide the necessary service data to the application; and creating a service data list on the basis of changed service data provided to the application, wherein said starting the service of the application comprises providing the application with service data transmitted to the managed blade.

18. A blade server comprising:

a management blade which manages service data necessary for a service of an application; and a managed blade in which the application is activated, said managed blade comprising:

a service data list creation unit which creates a service data list representing service data provided to the application after the service of the application starts; and a service data list transmission unit which transmits the service data list created by said service data list creation unit to said management blade, and said management blade comprising;

a service data list storage unit for storing the service data list transmitted from said service data list transmission unit; and a service data transmission unit which transmits, to said managed blade, service data in the service data list stored in said service data list storage unit before said managed blade starts and read out from said service data list storage unit after said management blade starts.

* * * * *